July 13, 1937.　　　　E. C. BULLARD　　　　2,086,845
BIMOTOR FEED WORKS
Filed June 7, 1934　　　　4 Sheets-Sheet 1

INVENTOR.
EDWARD C. BULLARD
BY A. T. Sperry
ATTORNEY

July 13, 1937.  E. C. BULLARD  2,086,845
BIMOTOR FEED WORKS
Filed June 7, 1934  4 Sheets-Sheet 3

INVENTOR.
EDWARD C. BULLARD
BY A.T. Sperry
ATTORNEY

July 13, 1937.  E. C. BULLARD  2,086,845
BIMOTOR FEED WORKS
Filed June 7, 1934  4 Sheets-Sheet 4

INVENTOR.
EDWARD C. BULLARD
BY A. T. Sperry
ATTORNEY

Patented July 13, 1937

2,086,845

UNITED STATES PATENT OFFICE 2,086,845

BIMOTOR FEED WORKS

Edward C. Bullard, Fairfield, Conn., assignor to The Bullard Company, a corporation of Connecticut Application June 7, 1934, Serial No. 729,366

8 Claims. (Cl. 82—21)

This invention relates generally to driving means for elements of machine tools, the invention being broadly applicable to various metal working tools and various elements thereof, although being here illustrated and described for use as a bi-motor feed works in connection with the tool heads of metal turning lathes.

While the general objects of the invention are to provide simplicity, automaticity, increased flexibility, ease of control and increased speed of the operating cycle, it is among the more specific objects to provide in combination two independent motorized driving trains for a desired element of a machine tool.

Another object is to provide in a two-motor drive combination, a reversible motor whereby the drive of the desired element (in the illustrated case, the tool head) from, at least, one of the motors may be in both directions.

More specifically it is an object to provide in a machine tool, a motor for driving the tool head in one direction at feeding speeds and a second reversible motor for driving the tool head, either forward or backward, at a higher rate of speed.

Another object is to provide, in combination with a motor for operating the tool at feeding speeds and a separate motor for traversing the tool, easily adjustable means for automatically maintaining an operating cycle for the motors, whereby, one may be started and stopped and the other started, stopped and reversed; such cycle being easily variable by the control means and automatically maintained after adjustment of the control means.

Another object is to provide, in such a simple, compact bi-motor feed works' arrangement, torque-responsive means entering into the control thereof for automatically weighing the load whereby the desire for self-contained automaticity may be served.

Numerous other objects, both general and specific, will be apparent from a consideration of the present specifications taken in conjunction with the drawings in which:

Fig. 3 is shown as broken away along the lines indicated by the dotted lines 3—3 of Fig. 4, while Fig. 4 is shown as broken along the dotted lines 4—4 of Fig. 3.

Figures 1, 5:
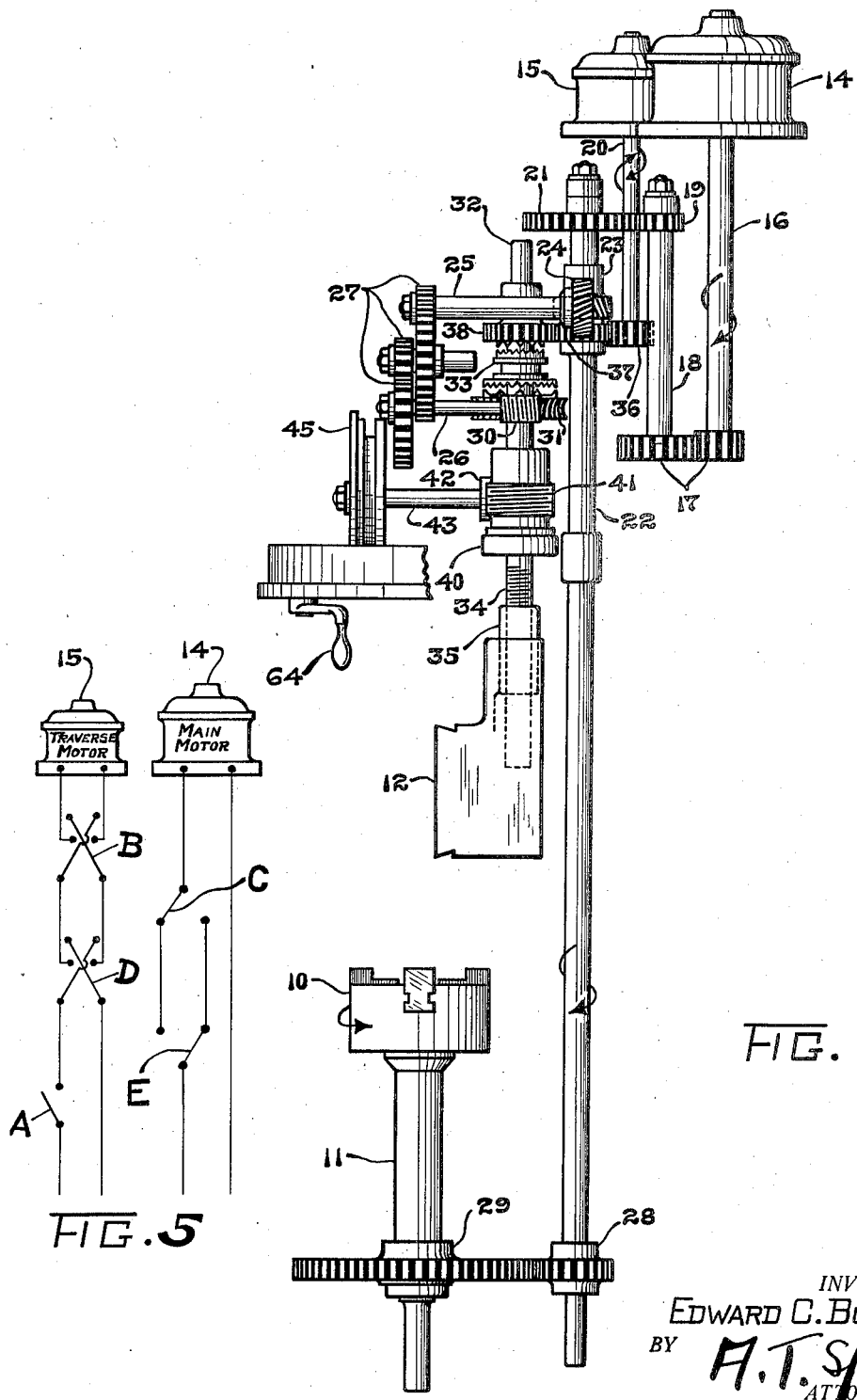
Fig. 1 is a side elevation, illustrating the drive of a single tool head and a single spindle through the use of present invention.
Fig. 5 is a wiring diagram showing one means of electrical wiring for a machine embodying the present invention.

For purpose of illustration, the invention is here shown in Fig. 1 as applied to a single spindle, single tool head machine. It is, however, distinctly understood that the bi-motor feed works here illustrated is broadly applicable, not only to a single spindle machine, with a plurality of tool heads and a plurality of feed works to operate them, but also to multiple spindle machines; for instance, those of the type shown in Patent 1,360,175. It may thus be said that the essence of the invention resides in a bi-motor feed works, with suitable automatic control arrangement, which preferably includes a load-weighing device. The invention is, therefore, not limited in its application to any specific machine tool structure.

In general terms, the invention provides a single shaft, which may be in the form of a screw, the rotation of which directly actuates one element of the machine tool such, for instance, as the tool head. This shaft may be selectively driven by either one of a pair of driving gears, preferably mounted directly thereon and selectively connected for driving by means of a movable clutch splined to the shaft and engageable with either of said gears. One of the gears may be driven by one motor at a speed such as to deliver to the shaft a rotation suitable for the moving of the tool head at feeding speeds, and it is preferable that such drive be established at a rate synchronous with the drive to the companion element of the tool, such as the work holder. For this purpose, the work spindle is driven from the shaft included in the drive train for the feeding gear. Suitable means, such as pick-off gears, may be provided for varying the relation of synchronism.

The other gear is adapted to be driven at a higher rate of speed, by a separate reversible motor, so as to impart a rapid downward movement of the head toward a cutting position and an equivalent rapid return movement of the head after the feeding movement. Such rotation is preferably independent of the work spindle; this being accomplished in the present form of the invention through the use of a separate and reversible drive train, and an individual reversible motor, such rapid movements being commonly referred to as traverse movements of the head.

For controlling the drive by the two gears, and for the selective clutching and unclutching of the shaft with such gears, an automatic mechanism is provided whereby, after initiation of operation, dogs carried by a timing disc operated with the feed shaft, will automatically time the actuation of the separate motors and the movements of the clutch so that various and widely flexible cycles of operation may be provided. The gear and clutch arrangement, per se, is set forth and claimed in my companion application, Serial Number 727,440, filed May 25, 1934, to which attention is directed.

The structure illustrated includes a specific lever arm arrangement for manipulation of the clutch by the disc. Obviously, various suitable arrangements could be utilized for this purpose, and the present invention does not embrace the specific structure shown by way of illustration, but is broadly directed to suitable operating means functioning in cooperation with the separate driving trains, a timing disc, and a load-weighing device. No claim is, therefore, made to the arm arrangement, itself, the same being considered as one of many equivalent means. Wide variation in the specific control structure is obviously permissible without departure from the spirit or scope of the invention.

Referring more particularly to Fig. 1 of the drawings, it will be seen that the illustrated embodiment of the invention contemplates its use as a bi-motor feed works in a machine tool of the lathe type, which includes a work-holding chuck 10, mounted upon a work spindle 11, and a tool head 12, adapted to support a tool not shown and adapted to reciprocate toward and from the work carried by the chuck 10.

Since the invention is broadly applicable to single spindle machines having either one or a multiple of tool heads, or to multiple spindle machines, in which case a group of the feed work assemblies would be arranged to care for the related groups of work spindles and tool heads, this application is not concerned with the base or body of the machine tool, or with specific structure of the tool head, or chucks, or with the mounting of the shafts. The skeleton or diagrammatic view Fig. 1, therefore, suffices to illustrate one preferred relationship of the machine tool elements involved.

In turning lathes of the type contemplated in the illustration of Fig. 1, the cycle of operation is as follows:—Work to be turned is placed upon the chuck 10, the tool head 12 is then brought down rapidly from an idle position to a point where the tools carried thereby are ready to start their cutting action. This movement is called the down-traverse movement. Thereafter, the head is fed slowly so as to move the tool at a cutting speed over the work surface. This movement is referred to as the feeding movement. At the completion of this movement, the head is rapidly withdrawn to the idle position; this latter movement being known as the up-traverse movement.

In the present invention, and for the purpose of carrying out the objects herein set forth, one motor indicated at 14 and referred to as the main motor, is utilized for moving the head during the feeding movements and since it is desirable that the speed of rotation of the work spindle be synchronized with that of the feeding movement, the spindle is driven with the feed works and from the main motor.

The main motor 14 is connected to drive a primary shaft 16, which is coupled by gears 17 to drive a parallel shaft 18, upon the upper end of which a gear 19 is provided, which meshes with a gear 21 mounted upon shaft 22; obviously the shaft 22 could be directly driven from the motor 14, but, for structural reasons, and primarily to readily adapt the invention to multiple tool head machines, the structure here illustrated includes the intermediary shaft 18 between the motor 14 and the shaft 22. This arrangement also permits readily changing the ratio of the gears 19 and 21, which may be pick-off gears, so as to provide a variation in the speed of shaft 22 with respect to the speed of motor 14.

For driving the tool head from the main motor through the shaft 22, a spiral pinion 23 is keyed to shaft 22 for rotation therewith. With the pinion 23, meshes a corresponding pinion 24 mounted upon the inner end of a horizontally-extending shaft 25. Drive from the shaft 25 to a parallel shaft 26 is maintained through pick-off gears, generally indicated by the numeral 27. This arrangement provides changes in the ratio of rotation between the shafts 25 and 26, and thus, provides variation for the speed of feed of the tool head with respect to the speed of rotation of the work spindle, which is driven from shaft 22, by means of the gear 28 mounted on the lower end thereof, meshing with the work spindle gear 29.

For rotating the feed shaft or screw 32, in response to the rotation of the shaft 26, the inner end of the shaft is provided with a worm 30, meshing with a companion gear 31, loosely mounted upon the feed screw; the feed shaft or screw 32 being adapted for coupling with the gear 31 for drive by the shaft 26 by a double-faced clutch 33, which is splined upon the shaft 32 and which may be moved downwardly from the neutral position of Fig. 1, whereby its lower clutch teeth will engage corresponding clutch teeth on the gear 31. With such engagement, the shaft 32 will be rotated from the motor 14 at feeding speeds.

It will be understood that the lower end of the shaft 32 is provided with threads 34, which engage corresponding threads in the collar 35 of the tool head 12, whereby rotation of the shaft 32 will impart movement of the head towards or from the work spindle in accordance with its direction of rotation.

The angular relation of the teeth, between the clutch 33 and the gear 31, is such that, in driving relation, there is a constant tendency for the teeth of the gear 31, to cam upwardly and out of engagement the clutch 33; such action is, however, restrained through the clutch control assembly hereinafter described, which may be briefly stated to include a variable balancing means so as to variably control the pressure required to throw out the clutch. By this means, automaticity in operation and an increased safety factor is provided, since, when the head 12 strikes a fixed stop or should the tool encounter excessive cutting strains, the torque between the gear 31 and the clutch 33 will be such as to throw out the clutch.

For moving the tool head in traverse, either up or down, a reversible traverse motor 15 is utilized. Since there is no occasion for the spindle to be driven in synchronism with the traverse movement, there is no connection from the traverse motor 15 for driving the spindle. The shaft 20 of the motor 15 has thereon a gear 36, meshing with an idler gear 37, loosely mounted on a shaft 22; the opposite side of the idler gear 37 engages gear 38 which, similar to gear 31, is loosely mounted on the shaft 32 and is adapted to be engaged for driving the shaft 32 by the upper clutch teeth on the clutch 33. Thus, when the clutch is moved from the neutral position of Fig. 1 to engage gear 38, the shaft 32 will be driven by the gear 38 and from the motor 15 and, since the motor is reversible, the movement of the tool head, in its traverse motion, will be in the direction corresponding to the direction of the rotation of the motor 15. It will, of course, be understood that either the speed of the motor 15, or the gearing between its shaft and the gear 38, is such that the gear 38 will be rotated rapidly as compared with the feeding rotation of the gear 31 and, in this way, either upward or downward, faster motion will be imparted to the head when the clutch 33 engages the gear 38 when the motor 15 is running.

Figure 2:
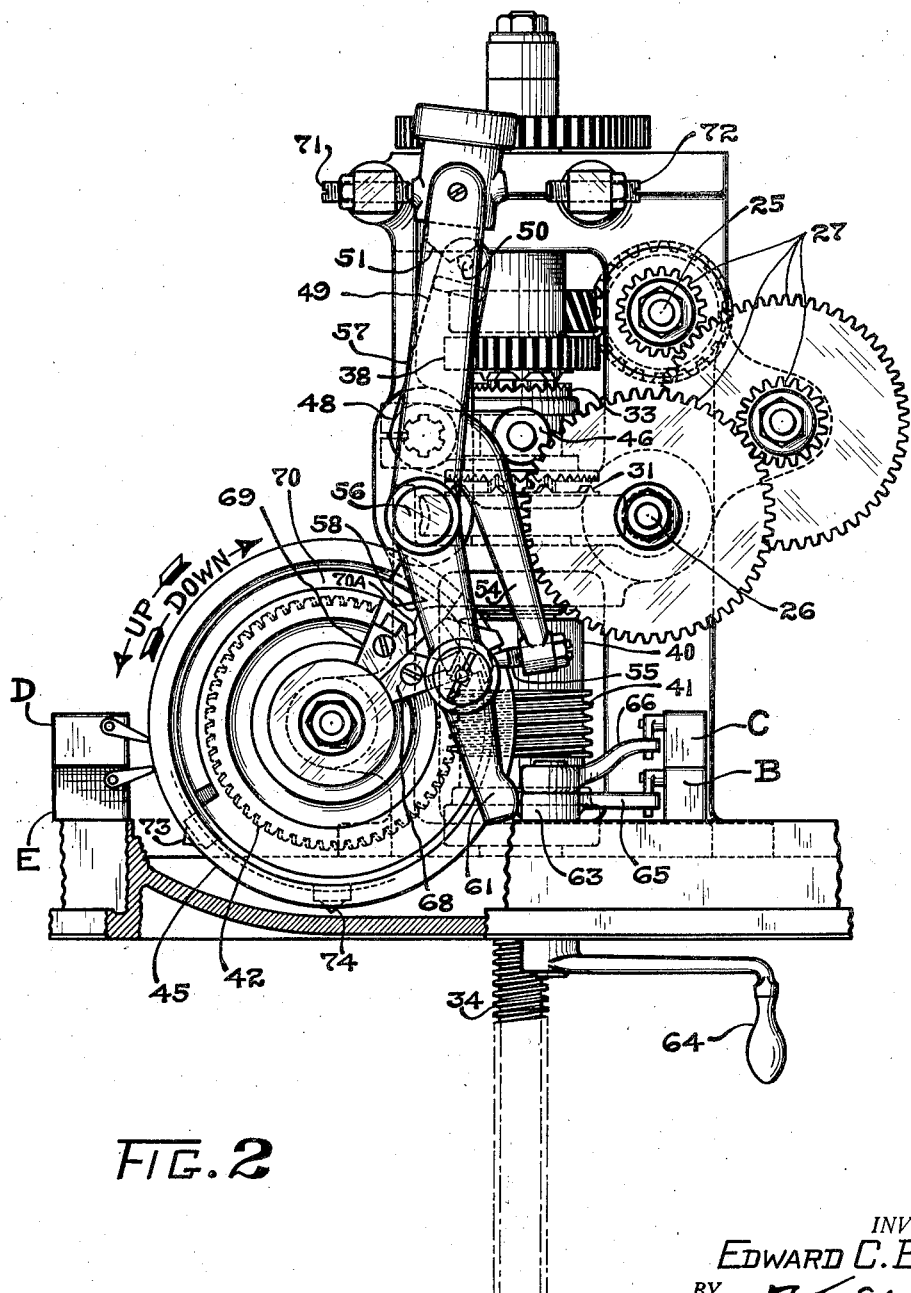
Fig. 2 is a front elevation of that structural embodiment of the invention shown in Fig. 1.

From a consideration of this structure, it will be seen that, with the motor 14 running and the clutch 33 in downward position, engaging gear 31, the tool head will be fed towards the work at feeding speed synchronized with the speed of the work spindle 11, both being driven by the motor 14 through shaft 22, the feed being variable with respect to the speed of the spindle by the selection of the gears 27 of the proper ratio, and that such feed will be thrown out in response to predetermined load. For traverse or rapid movement of the tool head, in either upward or downward direction, the tool head is driven from the motor 15 independent of the drive of the spindle; thus, when the clutch 33 is in a raised position engaging gear 38, the tool head will be moved rapidly in a direction corresponding to that in which the motor 15 is then rotated. It will be noted that the clutch 33 has a neutral position, in which position it is shown in Figs. 1 and 2; and thus, it is possible to arrange the cycle of operation such that both motors are running without the tool head being moved. Further, it will be noted that there is no restriction on the type of cycle which may be utilized. The machine is thus fully flexible, the arrangement being such that the spindle may have its drive continued from the motor 14 after the feeding motion is stopped, and while the motor 15 is operating to move the tool head in traverse speed.

With respect to the shaft 32, it is loosely referred to as a single shaft provided at its lower end with threads 34 engaging internal threads in the collar 35 of the tool head. However, in such devices it is preferable to provide a lost motion connection between the driving and driven ends of the shaft, and for this purpose, a conventional dwell mechanism, generally indicated by the numeral 40, is provided. Such mechanism forms no part of the present invention; and various couplings, which will actuate in a desired manner, and which are common to the art, may be used. Suffice it, therefore, to say, that the connection is such as to permit a slight respective movement between the shaft and the tool head whereby, upon cessation of movement by the tool head, as when it abuts a positive stop, a slight continued movement of the driving gear will be permitted. One of the principal purposes of such arrangement is to permit a continued movement of the spindle for a brief time after the tool has come to rest, thus avoiding leaving the tool in the cut. For the purpose of the present consideration, it will be understood that the dwell may be of a mechanical or a hydraulic nature and it may be incorporated either in the shaft or in the tool head. It will be understood that the invention is not dependent upon any specific dwell, or upon any dwell at all, and the invention is, therefore, not limited by the inclusion of the illustration and description thereof herein.

In that form of the invention illustrated, the casing of the dwell body, which is rotated positively at all times by and with rotation of the upper end of the shaft 32, is provided with helical teeth 41, which engage a gear 42 mounted upon a shaft 43, which carries a timing disc 45, the arrangement being such that the timing disc is, at all times, positively rotated in accordance with the rotation of the upper end of the shaft, and does not reflect any lost motion which may be imparted by means of the dwell to the lower end of the shaft and to the tool head.

For operating the clutch 33, manually and automatically from the timing disc, and in addition to its torque-responsive movement hereinbefore referred to, the clutch is directly engaged by an operating yoke 46 mounted upon an operating shaft 47, which forms the fulcrum for a rocker 48 to which it is secured for rotation therewith. The member 48 is provided with two rocker arms, a substantial, vertically-extended one 49, the upper end of which is furcated; a pin 50 extending between the furcation thereof being adapted to bear against one or the other of the slanting faces of an arrowhead 51 which, thereby, provides a yieldable urging member for maintaining the clutch in one or the other of its positions. The arrowhead 51 is slidably mounted through an aperture in a box formed on an arm 57, and is normally urged outwardly by a coil spring 52, the opposite end of which abuts a threaded cap 53. By adjustment of the cap 53, it will be seen that the outward pressure of the arrowhead 51 may be conveniently regulated. The second arm 54 of the rocker extends downwardly and has, at its extremity, an adjustable dog-engaging screw 55, which is adapted to be controlled by a dog of the control drum.

Associated with the rocker 48 and pivoted independently thereof, as at 56, is a lever having an upwardly extending arm 57 and a lower arm 58. The relation of the lever with the rocker 48 is maintained only through the connection of the arrowhead. The upper portion of the lever 57 supports the arrowhead assembly, hereinbefore referred to, while the lower portion has mounted, intermediate its ends, a spring-urged plunger 60, the inner end of which protrudes inwardly from the arm 58 so as to provide a cam-engaging point, which may be manually moved against its spring tension, so it will clear the disc during such times as an adjustment of the dogs on the disc is required. The further lower extremity of the arm 58, terminates in a portion 61 adapted to be engaged and operated by arm 62 of a bell crank 63 carried by a manual operating lever 64. Upon actuation of lever 64, the arm 62 engages the arm 58 and moves it in clockwise direction for starting the machine cycle. By such movement, the arrowpoint is moved to the right from its neutral position shown in Fig. 2 and passes over the pin 50 of arm 49, the rocker 48 being restrained from movement in the clockwise direction with the lever by the screw 55, which rests upon the dwell of a dog 68 of the timing disc, as hereinafter described.

The bell crank 63 also includes an arm 65, which is adapted, upon actuation, to operate a switch B, its operation being preferably in advance of the movement of the lever 61 by the arm 62 of the bell crank. The hand lever 64 also operates an arm 66, which operates a switch C; the sequence of operations upon movement of the lever 64, although being variable, is preferably the actuation, first, of switch C, then switch B and lastly, of the lever arm 58.

Referring more particularly to the timing disc, as more clearly illustrated in Fig. 2, it will be seen to be provided with a dog 68, above referred to, including a shoulder or dwell portion upon which the screw 55 is adapted to rest when the mechanism is in neutral position. The dog 68 also provides an inclined portion which, together with the flat outer periphery of the dog 68, generally performs no function, but they do insure the neutralizing of clutch 33.

The disc 45 is also provided with a dog 69 having an arcuate segment 70 and a slanting body cam 70A; the latter, at the end of the down-traverse movement, moves the lever arm 58 thru its pin 60, counter-clockwise towards the feeding position for the arrowhead. The slanting right hand end of the arcuate segment 70 is adapted to retract the pin slightly, so as to move the arrowhead to a mid-way position between the stops 71 and 72, the lever being so held in this position by the under-face of the arcuate portion of the segment 70 until the end of the feeding movement.

The disc 45 is further provided with peripheral dogs 73 and 74, which are adapted to selectively actuate electrical switches D and E for the control of motors 14 and 15, as will be hereinafter explained. It will, of course, be understood that the positioning of the dogs of the disc may be readily variable so as to control the characteristics of the operating cycle.

In the operation of the device, starting with the parts as shown in Fig. 2, the operator first closes the switch A, indicated in Fig. 5, which acts as a main control switch for the power traverse motor circuit, which is thereby energized in up-traverse direction. He then moves the hand lever 64, which acts, first, to energize the main motor 14 by actuating the switch C, thru the medium of the arm 66, thus starting the rotation of the work-holding chuck 10. A further slight movement of the hand lever actuates the switch B, thru the medium of the arm 65, which reverses and energizes the traverse motor 15 for downward direction of movement and, completing the movement of the hand lever, acts to move the arm 58, thereby moving the arrowhead 51 to the right in Fig. 2 until the arm 57 abuts the stop 72; the arrowhead having moved past the pin 50 in opposite direction from the position shown in Fig. 2. This action thereby rocks the rocker 48 in counter-clockwise direction, thus moving the clutch 33 upwardly and into engagement with the gear 38, and thus starting the down-traverse of the tool head 12 by rotating the feed shaft or the screw 32, which rotates the timing disc 45 in the direction denoted by the arrow marked "Down" in Fig. 2. Note that the arm 54, with its screw 55, has been moved out of the way of the end of the dog 68 by the movement of the hand lever 64.

As the tool head terminates its downward traverse movement, and as the disc rotates therewith, the lower slanting face 70A of the dog 69 strikes the pin 60, thus moving the lever arms 57 and 58 in a counter-clockwise direction as opposed to the position they had been put in by the movement of the hand lever 64. This movement carries the arrowhead 51 to the left of the pin 50, thus rocking the rocker 48 and throwing the clutch 33 downwardly into feed. At the same time, or shortly thereafter, the switch D, (see Figs. 2 and 5), is actuated by its dog 73 on the disc to break the circuit of the traverse motor 15 and re-energize it, in reverse, to be ready later for the up-traverse of the tool head. Obviously, if desired, the dogs may be arranged to permit the traverse motor to remain idle during feeding movement. A further movement of the disc causes the end slanting face, segment 70, to carry the arrowhead and arm to an intermediate position, merely to shorten the movement required to disengage feed later. The arrowhead and arm is held in this intermediate position by the arcuated portion 70 of the dog 69 until the termination of the feeding movement.

Figure 3:
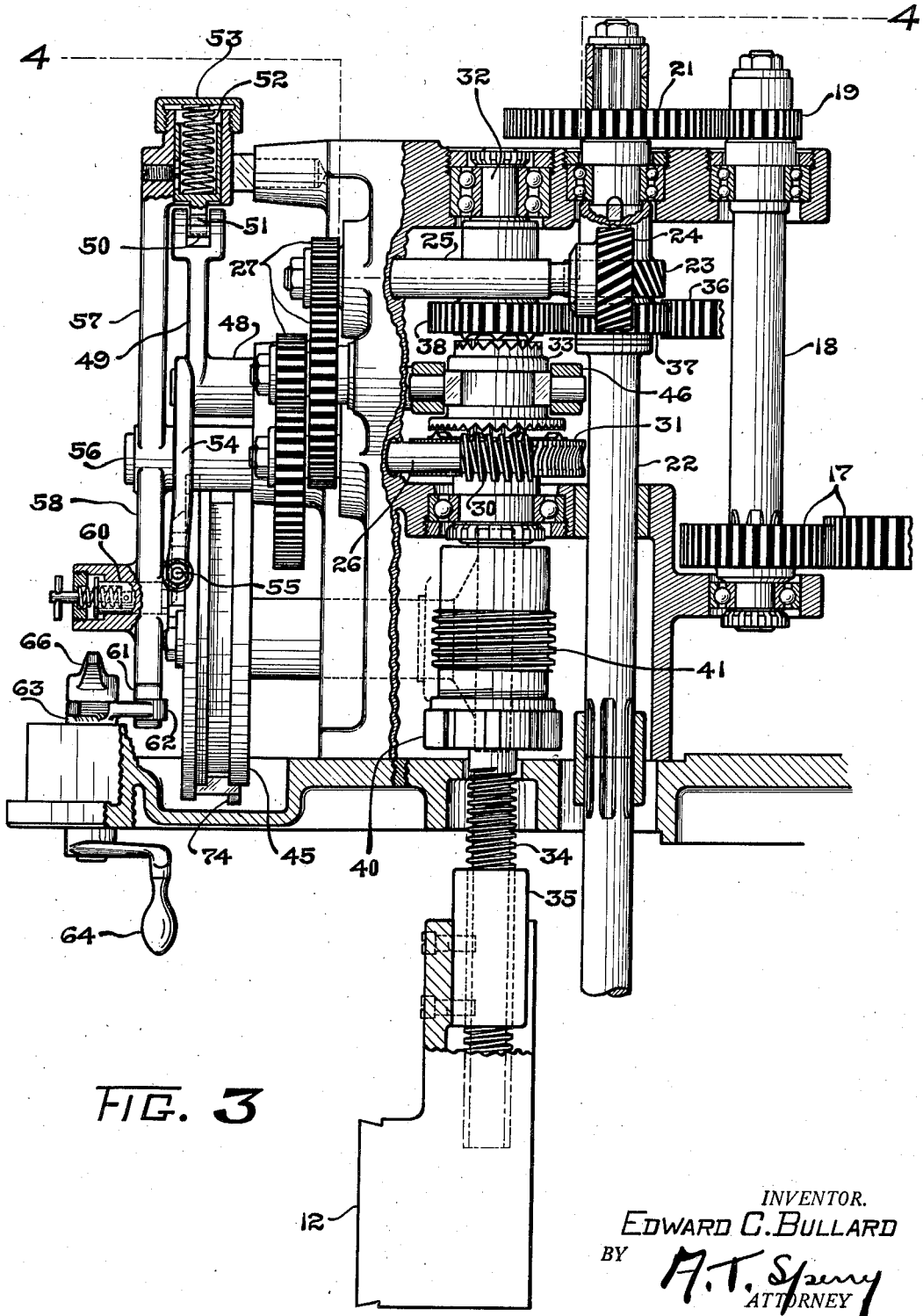
Fig. 3 is a side elevation, with the frame work partially broken away, of that structure shown in Fig. 2.
Figure 4:
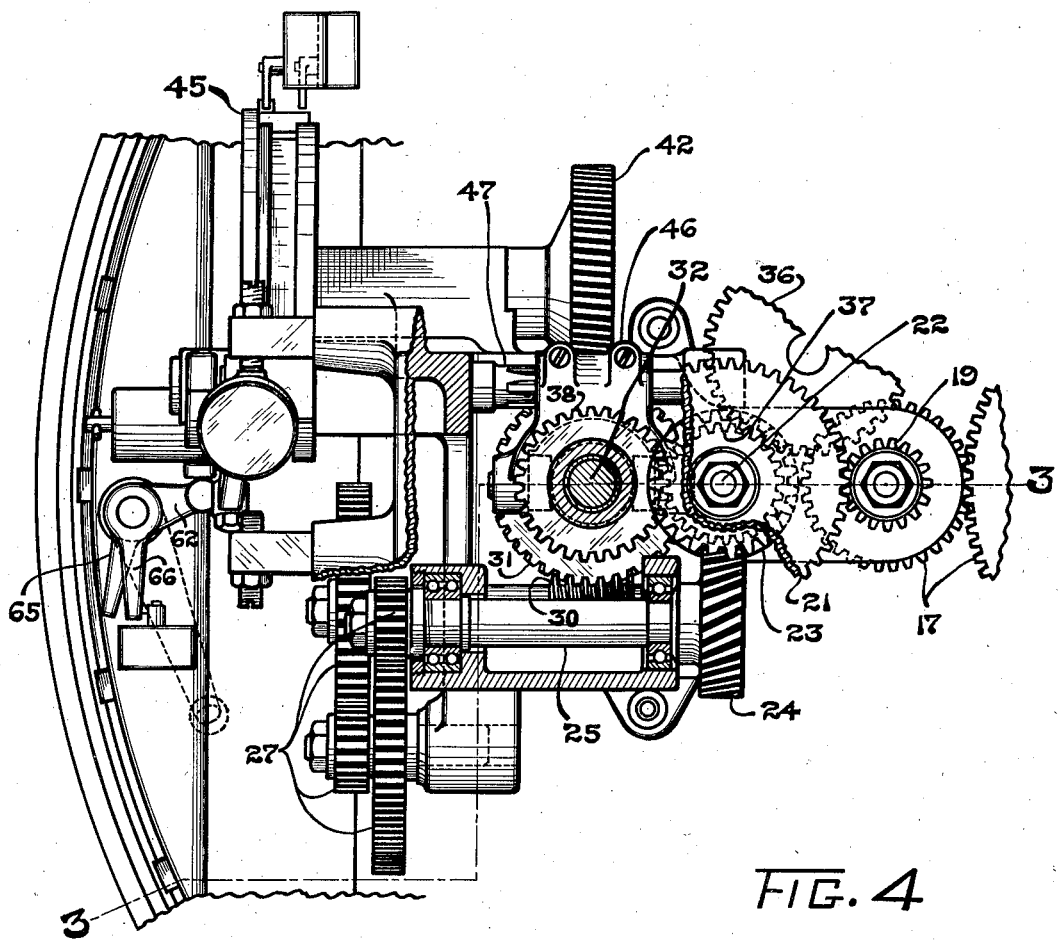
Fig. 4 is a plan view.

The feeding movement may be terminated either by the tool striking an abutment, or some interference, so that the pressure required for camming of the clutch is built up; or, if desired, a dog may be provided on the disc for actuating the rocker 48, in either instance, the clutch 33 moves upwardly with the rocker 48, thus moving the pin 50 past the point of the arrowhead and toward the left, whereby the arrowhead completes the movement of the rocker 48 causing engagement of the clutch 33 with the gear 38, the direction of rotation of the gear having previously been reversed by reversal of the motor 15 by switch D. This engagement initiates the up-traverse of the tool head 12 and reverses the direction of rotation of the timing disc 45, as denoted by the arrow marked "Up" in Fig. 2. At the same time, or shortly thereafter, the switch E, (see Figs. 2 and 5), is actuated by its dog 74 on the disc to break the circuit of the main motor 14. When the tool head reaches its uppermost position, the lower slanting face, of the dog 68, strikes the pin 60, indicated in Fig. 3, thus moving the lever arms 57 and 58 in a counter-clockwise direction. This movement carries the arrowhead 51 to the left of the pin 50, thus rocking the rocker 48, which moves the clutch 33 downwardly out of engagement with the gear 38, and into a neutral position, the clutch being held thus, as in Fig. 2, by the adjustable screw 55 abutting the dwell on dog 68.

In the foregoing description, it will be seen that the present invention forms a simple, compact and efficient feed works mechanism which performs, in accordance with the objects set forth, to give simple, efficient and direct automatically controlled, bi-motor drive for the tool head. It will also be noted that by adjustments of the dogs of the timing disc, operating cycles of various characteristics may be provided. It will be further noted that variations in the electrical circuit may be resorted to; the circuit herein indicated being merely shown by way of illustrating one practical circuit. In connection with the circuit for the motor 15, it preferably includes a switch A, which may be a manually controlled switch, and, since the operation of the motor 14 depends upon actuation of the lever 64 to throw the switch C and movement of the timing disc 45 to throw the switch E, it will be noted that the switch A may be used as a general control switch. From this consideration, it will, therefore, be seen that numerous changes and modifications, and the full use of the equivalent, may be resorted to in the practice of the invention without departing from the spirit or scope of the invention as outlined in the pending claims.

Having thus set forth the nature of my invention, what I claim is:

1. In a machine tool feed works, a motor and a driving train for driving the same and a work spindle at working speeds, another motor and a wholly independent driving train for driving the feed works in two directions at traverse speeds, and means, operable with the drive of the feed works, for automatically controlling the operation of the motors and the drive of the feed works thereby through predetermined cycles.

2. In a machine tool feed works, a motor and a driving train for driving the same and a work spindle at working speeds, another motor and a wholly independent driving train for driving the feed works in two directions at traverse speeds, and means, operable with the drive of the feed works, for automatically controlling the operation of the motors and the drive of the feed works thereby through predetermined cycles, said means being adjustable to vary the characteristics of such cycles.

3. In a lathe, a rotary work support, a movable tool support, a rotary element, connectible with said tool support, to move the same, a slow speed motor, a gearing connecting said work support and said motor, a mechanism including a clutch for connecting said element and said motor, and a high speed reversible motor for rotating said element through said clutch independently of said first mentioned motor.

4. In a machine tool, a work spindle, a tool head, a driving train for driving the work spindle, means for connecting said driving train with the tool head for feeding the tool head with the work spindle, a driving train for moving the tool head, toward and from the spindle, means for independently driving each of said trains whereby they may be operated successively or con-currently, and independent motors for driving each of said trains.

5. In a machine tool feed works, the combination of a feed screw and a pair of gears, loosely mounted on said screw, independent motors for driving each of said gears, a connection from one of said motors for driving a work spindle, synchronously with one of said gears, a timing disc rotatable with said screw, a clutch for selectively engaging either one of said gears with said screw to drive said screw selectively thereby, and dogs on said timing disc for controlling said clutch and for controlling the energization of said motors.

6. In a machine tool, a work spindle, a tool head, a driving train for driving the work spindle, variable speed means for connecting said driving train with the tool head for feeding the tool head in synchronism with the work spindle drive, a reversible driving train for moving the tool head toward and from the work spindle independent of the work spindle drive, and means for independently driving each of said trains.

7. In a machine tool, a work spindle, a tool head, a driving train for driving the work spindle, means for connecting said driving train with the tool head for feeding the tool head in synchronism with the work spindle drive, a reversible driving train for moving the tool head toward and from the work spindle independent of the work spindle drive, and means for independently driving each of said trains.

8. In a machine tool, a work spindle, a tool head, a driving train for driving the work spindle, variable speed means for connecting said driving train with the tool head for feeding the tool head in synchronism with the work drive, a reversible driving train for moving the tool head toward and from the work spindle independent of the work spindle drive, and means for independently driving each of said trains.

EDWARD C. BULLARD.